US012630090B2

(12) United States Patent
Sivadas et al.

(10) Patent No.: US 12,630,090 B2
(45) Date of Patent: May 19, 2026

(54) SIDESTEP ASSEMBLY FOR AN INDUSTRIAL VEHICLE

(71) Applicant: Volvo Truck Corporation, Gothenburg (SE)

(72) Inventors: Adith Sivadas, Malappuram (IN); Akshay Natarajan, Hosur (IN); Sudhindra Ks, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 393 days.

(21) Appl. No.: 18/346,596

(22) Filed: Jul. 3, 2023

(65) Prior Publication Data

US 2024/0010130 A1     Jan. 11, 2024

(30) Foreign Application Priority Data

Jul. 8, 2022     (EP) ..................................... 22183946

(51) Int. Cl.
B60R 3/02          (2006.01)
(52) U.S. Cl.
CPC ..................................... B60R 3/02 (2013.01)
(58) Field of Classification Search
CPC ....................................................... B60R 3/02
See application file for complete search history.

(56) References Cited

U.S. PATENT DOCUMENTS

| | | | |
|---|---|---|---|
| 3,887,216 A | 6/1975 | Perry | |
| 4,053,172 A | 10/1977 | McClure | |
| 5,007,654 A | 4/1991 | Sauber | |
| 5,758,891 A | 6/1998 | Fox, Jr. | |
| 6,000,496 A | * 12/1999 | Rinaldi | .................... B60R 3/02 182/127 |
| 2016/0339843 A1 | 11/2016 | Rinaldi | |
| 2020/0215986 A1 | 7/2020 | Exline | |

FOREIGN PATENT DOCUMENTS

CN          112706695 A       4/2021

OTHER PUBLICATIONS

Extended European Search Report for European Patent Application No. 22183946.7, mailed Apr. 6, 2023, 9 pages.

* cited by examiner

*Primary Examiner* — Bryan A Evans
(74) *Attorney, Agent, or Firm* — Withrow & Terranova, PLLC

(57)          ABSTRACT

A sidestep assembly for helping a user entering a cabin of an industrial vehicle, the sidestep assembly comprising a frame comprising an upper member, a lower member on which the user can step for accessing and exiting the cabin, and an elastic member, in which the upper member is configured to be fixed to the industrial vehicle by the elastic member so that the frame can be elastically displaced relative to the cabin when the frame is impacted by an obstacle.

14 Claims, 7 Drawing Sheets

SIDESTEP ASSEMBLY FOR AN INDUSTRIAL VEHICLE

RELATED APPLICATIONS

The present application claims priority to European Patent Application No. 22183946.7, filed on Jul. 8, 2022, and entitled "SIDESTEP ASSEMBLY FOR AN INDUSTRIAL VEHICLE," which is incorporated herein by reference in its entirety.

TECHNICAL FIELD

This disclosure relates to a step assembly for equipping an industrial vehicle, like a construction truck or a mining truck.

BACKGROUND ART

Industrial vehicles like trucks are equipped with boarding steps for helping the truck driver, or passenger, getting into the cabin of the truck. Usually, a first boarding step is installed on the side of the truck, between the front wheel and the front bumper in a longitudinal direction of the vehicle, approximately at the height of the front bumper in a vertical direction. This first boarding step may be quite far above the ground level, and can therefore be difficult to reach, particularly for short people. It therefore common to implement a second step closer to the ground. On off-roads vehicles such as mining trucks, this second step is usually located within the area included in the approach angle of the vehicle. Therefore, this second step can easily be damaged by stones or various obstacles when the vehicle is driven on rough surfaces, as it is the case for example for mining trucks. In order to avoid this inconvenience that requires frequent maintenance and servicing, these second side-steps are often dismantled and removed by the truck owner when receiving a brand-new truck. Not having this second step available is an inconvenience for the short drivers or passengers and can become a hazard as the risk of falling when access out exiting the truck is increased.

There is a need for making available a sidestep assembly which doesn't get damaged when the vehicle is driven in rough off-road conditions.

SUMMARY

To this end, it is proposed a sidestep assembly for helping a user entering a cabin of an industrial vehicle, the sidestep assembly comprising:
a frame comprising:
an upper member,
a lower member on which the user can step for accessing and exiting the cabin,
an elastic member,
in which the upper member is configured to be fixed to the industrial vehicle by the elastic member so that the frame can be elastically displaced relatively to the cabin when the frame is impacted by an obstacle.

When the sidestep assembly is installed on an industrial vehicle, and the vehicle is driven over a rough surface comprising large obstacles, the frame can be impacted by an obstacle. When this happens, the frame can be moved by the obstacle so it can be deflected without being damaged. Once the obstacle has been cleared, the frame is brought back into position by the elastic member.

The following features can optionally be implemented, separately or in combination one with the others:

In an embodiment of the sidestep assembly, the frame is rigid.

The industrial vehicle on which the sidestep assembly is intended to be installed is for example an off-road vehicle.

A first end of the elastic member is fixed to the upper member.

A second end of the elastic member is configured to be fixed to the industrial vehicle.

The lower member is a foot support for the user for reaching the cabin.

The elastic member is located between the frame and the cabin.

The sidestep assembly extends along the side of the cabin when the sidestep assembly is in its nominal installation position on the industrial vehicle.

The main direction of extension of the upper member is the longitudinal direction of the industrial vehicle.

The main direction of extension of the lower member is the longitudinal direction of the industrial vehicle.

According to an embodiment of the sidestep assembly, the frame comprises a first connection member linking the upper member and the lower member, and the first connection member makes an acute angle with the upper member and the first connection member makes an obtuse angle with the lower member.

The angulation of the first connection member helps clearing the obstacles impacting the frame.

The first connection member is oriented towards the front of the industrial vehicle when the sidestep assembly is in its nominal installation position on the industrial vehicle.

The first connection member makes an angle comprised between 110° and 140° with the extension plane of the lower member.

The lower member and the upper member may be parallel.

In an embodiment of the sidestep assembly, the first connection member is curved, the curvature of the first connection member being oriented towards the upper step member.

The first connection member is the part that's most likely to impact an obstacle when the industrial vehicle is driven in the forward direction. The curved shaped of the first connection member makes the obstacles easier to clear.

In an embodiment of the sidestep assembly, the frame comprises a second connection member linking the upper member and the lower member.

The second connection member is oriented towards the back of the industrial vehicle when the sidestep assembly is in its nominal installation position on the industrial vehicle.

The second connection member may be perpendicular to the lower member.

The second connection member may be perpendicular to the upper member.

The frame has a general shape of a parallelogram.

In an embodiment in which the first connection member is curved, the general shape of the frame is a parallelogram with one curved side.

In an example of implementation, the frame is metallic.

The frame may comprise metallic sheets fixed to metallic posts.

In an embodiment of the sidestep assembly, the elastic member comprises a helical spring.

In a particular embodiment, the elastic member comprises two helical springs extending along parallel axis.

In another embodiment, the sidestep assembly may comprise at least three helical springs, the ends of the springs defining a regular triangle.

This arrangement provides stability to the sidestep assembly.

The sidestep assembly may be fixed to the industrial vehicle only by the helical springs.

In that case, the frame can have a rotation motion combined with a translation motion relatively to the industrial vehicle.

In an embodiment of the sidestep assembly, each helical spring extends in a median longitudinal plan of the frame.

According to an embodiment, the sidestep assembly comprises a guiding system configured for guiding the frame along a displacement axis.

The guiding system may comprise a plurality of guiding rods fitted in reception holes of the frame.

The helical springs may be coaxial with the guiding rods.

In an embodiment of the sidestep assembly, the frame can be moved in a direction perpendicular to a surface of the lower member between a lower position and an upper position, and the sidestep assembly comprises a first abutment member configured for blocking a transverse motion of the frame when the frame is in the lower position.

The first abutment member is configured for allowing a transverse motion of the frame when a distance between the frame and the lower position is higher than a first predetermined distance.

The first abutment member comprises a first abutment surface facing the frame when the frame is in the lower position.

The first abutment member faces the lower member when the frame is in the lower position.

The first abutment surface is offset from the frame when a distance between the frame and the lower position is higher than the first predetermined distance.

In an embodiment, the sidestep assembly comprises a second abutment member configured for blocking a vertical motion of the frame when the frame is in the lower position.

The second abutment member comprises a second abutment surface on which the frame abuts when the frame is in the lower position.

The second abutment surface may be disposed on a guiding rod.

The helical spring may be preloaded.

The sidestep assembly may comprise a third abutment member configured for blocking a longitudinal motion of the frame when the frame is in the lower position.

The third abutment member may comprise a third abutment surface facing the frame when the frame is in the lower position.

The third abutment surface is offset from the frame when a distance between the frame and the lower position is higher than the third predetermined distance.

The disclosure also relates to an industrial vehicle comprising a step assembly as described earlier, in which the upper member is fixed to the industrial vehicle by the elastic member.

In an embodiment of the industrial vehicle, the elastic member comprises two helical springs each extending parallelly to the vertical direction, and the two helical springs are disposed in a plan parallel to a longitudinal axis of the industrial vehicle.

The upper member can for example be fixed to the chassis of the industrial vehicle.

Alternatively, the upper member can be fixed to the cabin of the industrial vehicle.

The first connection member comprises a first end and a second end, the first end of the first connection member is closer to the front of the industrial vehicle than the second end of the first connection member.

The helical springs extend along a vertical axis when the frame is free of external constraints.

In an embodiment, the cabin comprises at least one fixed step, the fixed step and the step assembly overlap each other along a longitudinal axis of the industrial vehicle.

For example, the fixed step and the step assembly may be aligned along a vertical axis.

The industrial vehicle may for example be an off-road vehicle.

The industrial vehicle may for example be a mining truck, or a construction truck.

In an embodiment, the industrial vehicle comprises:
a first step assembly as described earlier, in which the upper member is fixed to the industrial vehicle on a first side of the vehicle corresponding to a driver entry door,
a second step assembly as described earlier, in which the upper member is fixed to the industrial vehicle on a second side of the vehicle corresponding to a passenger entry door.

BRIEF DESCRIPTION OF DRAWINGS

Other features, details and advantages will be shown in the following detailed description and on the figures, on which.

DETAILED DESCRIPTION

In order to make the figures easier to read, the various elements are not necessarily represented to scale. In these figures, identical elements receive the same reference number. Certain elements or parameters can be indexed, that is to say designated for example by 'first element' or second element, or first parameter and second parameter, etc. The purpose of this indexing is to differentiate elements or parameters that are similar, but not identical. This indexing does not imply a priority of one element, or one parameter over another, and their names can be interchanged. When it is mentioned that a subsystem comprises a given element, the presence of other elements in this subsystem is not excluded.

Figure 1:
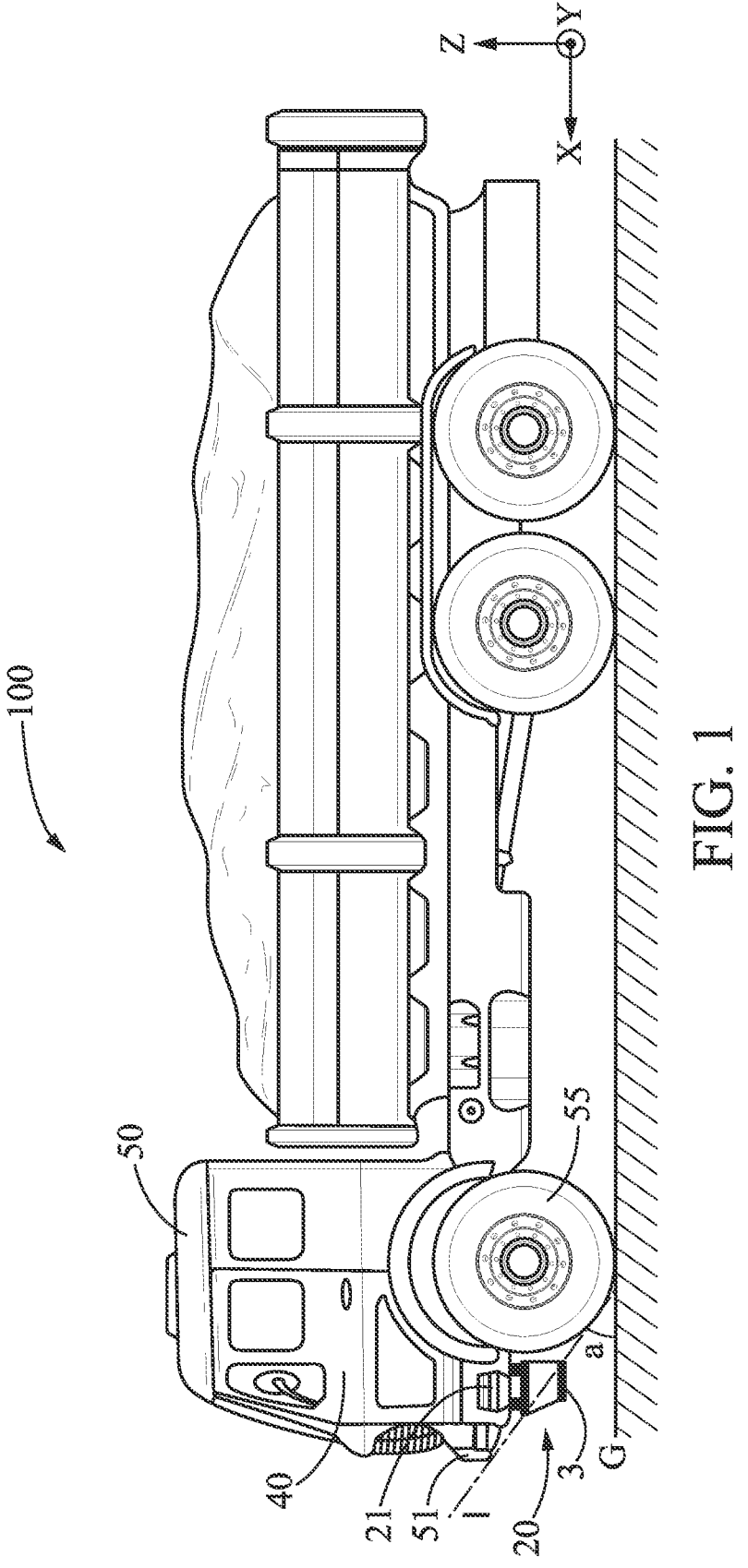
FIG. 1 is a schematic side view of an industrial vehicle equipped with a sidestep assembly according to the disclosure.

FIG. 1 represents an industrial vehicle 100 comprising a step assembly 20 that will be described in details hereafter. The industrial vehicle 100 on which the sidestep assembly is installed is here an off-road vehicle. More precisely, the industrial vehicle 100 is here a mining truck. It could also be a construction truck.

The sidestep assembly 20 can be used for helping a user entering a cabin 50 of an industrial vehicle 100. The sidestep assembly 20 comprises:

a frame 1 comprising:
an upper member 2,
a lower member 3 on which the user can step for accessing and exiting the cabin,
an elastic member 4.

The upper member 2 is configured to be fixed to the industrial vehicle 100 by the elastic member 4 so that the frame 1 can be elastically displaced relatively to the cabin 50 when the frame 1 is impacted by an obstacle. In other words, the upper member 2 is fixed to the industrial vehicle 100 by the elastic member 4 when the sidestep assembly 20 is in its nominal installation position on the industrial vehicle 100.

The upper member 2 can for example be fixed to the chassis of the industrial vehicle. Alternatively, the upper member 2 can be fixed to the cabin 50 of the industrial vehicle 100.

The lower member 3 is a foot support for the user for reaching the cabin 50. In side view of the vehicle, as represented on FIG. 1, the lower member 3 of the sidestep assembly 20 is at least partially located in the approach area of the industrial vehicle 100. The dotted line I, which is tangent to the bottom of the front bumper 51 and to the front wheel 55, defines the approach angle a of the truck 100. As schematically represented, at least a part of the lower member 3 is located in the angular sector limited by the ground level G and by the dotted line I indicating the approach angle a.

Figure 2:
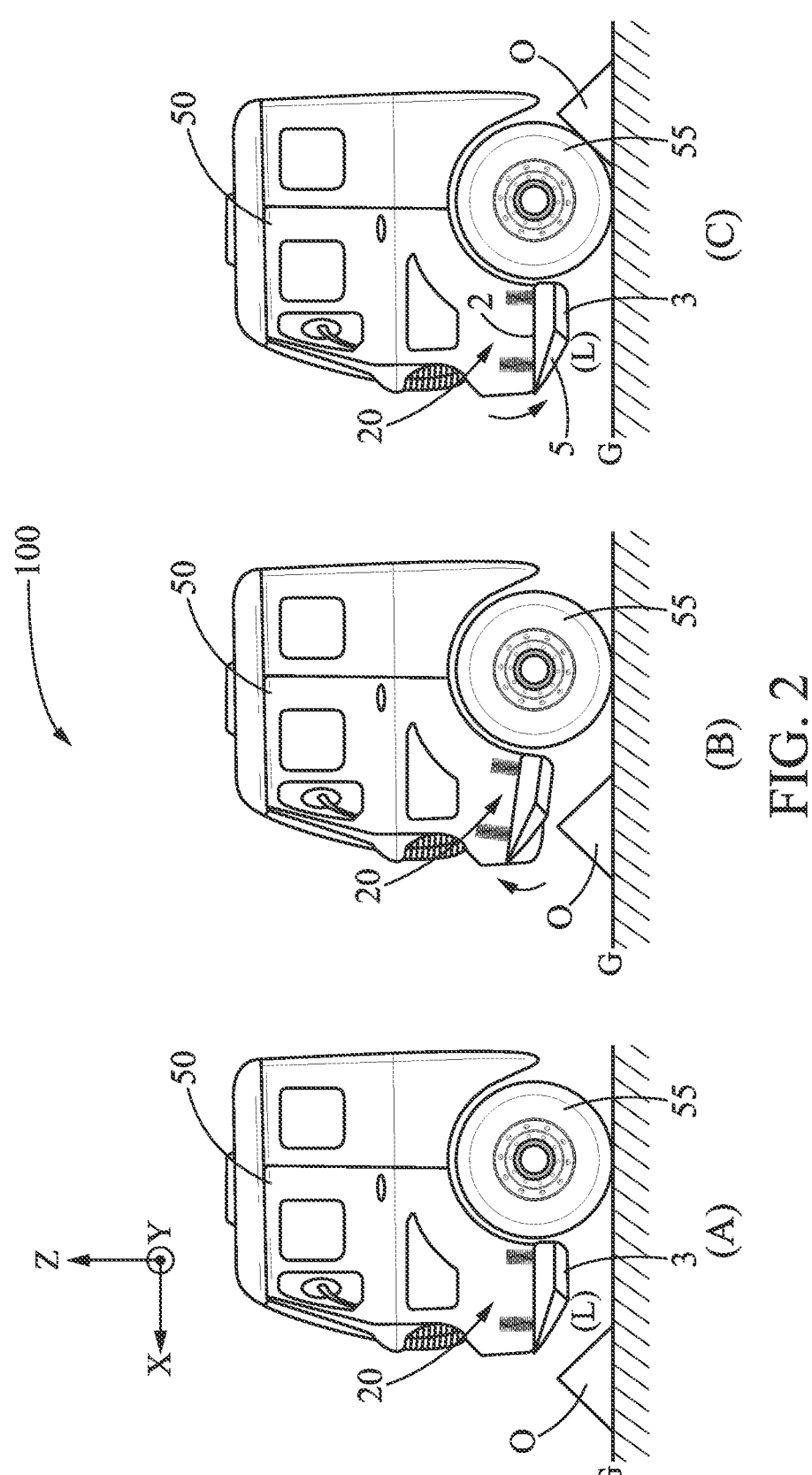
FIG. 2 is a schematic side view illustrating the operation of a sidestep assembly according to the disclosure.

When the sidestep assembly 20 is installed on the industrial vehicle 100 and the vehicle is driven over a rough surface comprising large obstacles, the frame 1 is likely to be impacted by obstacles like rocks, as it is located within the approach angle area. When this happens, the frame 1 can be moved under the force applied by the obstacle. The frame 1 can thus be deflected without being damaged. Once the obstacle has been cleared, the frame 1 is brought back into the initial position L by the elastic member 4. FIG. 2 illustrates this sequence of events. On part A of FIG. 2, the obstacle O is still ahead of the whole vehicle 100. The step assembly 20 is in the lower position L. On part B, the obstacle impacts the step assembly 20 and deflects it in the upward direction. The wheel 55 of the truck has not reached yet the obstacle. On part C, the wheel 55 has just cleared the obstacle O and the step assembly 20 is back into its initial position lower position L.

In the embodiment of FIG. 1, the cabin 50 comprises at least one fixed step 21. The fixed step 21 and the step assembly 20 overlap each other along a longitudinal axis X of the industrial vehicle 100. For example, the fixed step 21 and the step assembly 20 may be aligned along a vertical axis Z. The cabin 50 may also comprise more than one fixed step. The fixed step and the step assembly form a set similar to the steps of a ladder that the driver can use to access to get in and out of the cabin 50.

In the exemplary embodiment of the sidestep assembly 20, the frame 1 is rigid. In other words, the various elements forming the frame don't have any kinematic degree of freedom relatively to each other. The frame 1 keeps a fixed geometry, unless a mechanical constraint superior to the elastic limit is applied.

By definition, the upper member 2 is closer to the cabin 50 than the lower member 3 when the sidestep assembly 20 is in its nominal installation position on the industrial vehicle 100. The lower member 3 is closer to the ground than the upper member 2 when the sidestep assembly 20 is in its nominal installation position on the industrial vehicle 100.

A first end of the elastic member 4 is fixed to the upper member 2. A second end of the elastic member 4 is fixed to the industrial vehicle 100. The elastic member 4 is located between the frame 1 and the cabin 50.

The sidestep assembly 20 extends along the side of the cabin 50 when the sidestep assembly 20 is in its nominal installation position on the industrial vehicle 100, as represented on FIG. 1 and FIG. 2.

The main direction of extension of the upper member 2 is the longitudinal direction X of the industrial vehicle 100. The main direction of extension of the lower member 3 is also the longitudinal direction X of the industrial vehicle 100. In the meaning of the present disclosure, the main direction of extension of an element is the direction corresponding to the largest dimension of the element. The longitudinal axis X, the transversal axis Y and the vertical axis Z are orthogonal.

Figure 5:
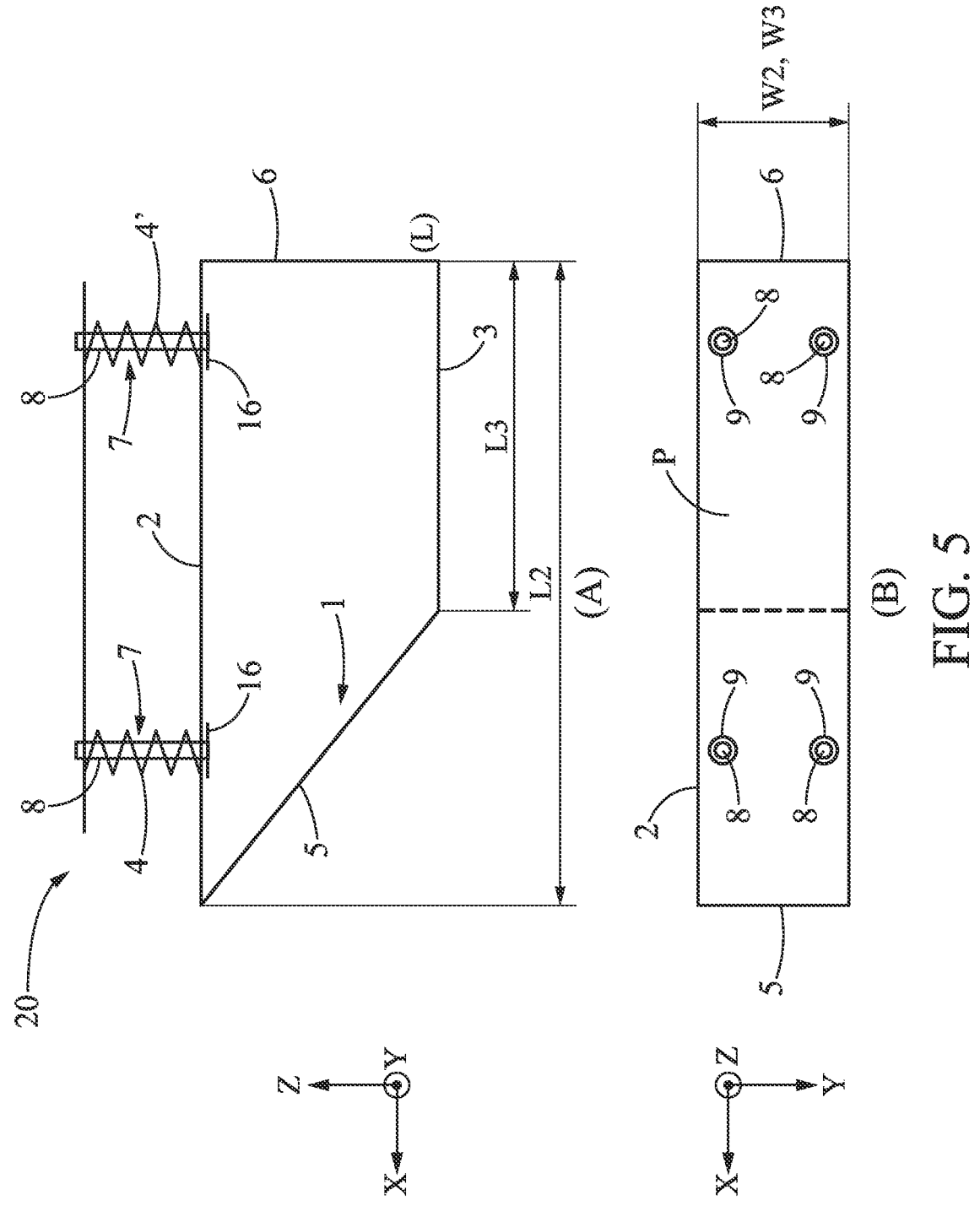
FIG. 5 shows schematic views of a third embodiment of a sidestep assembly.

In other words, and as represented on FIG. 5, the length L3 of the lower member 3 and the length L2 of the upper member 2 are measured along the longitudinal axis X of the industrial vehicle 100. The width W2 of the lower member 3 and the width W3 of the upper member 2 are measured along the transverse axis Y of the industrial vehicle 100.

Figure 3:
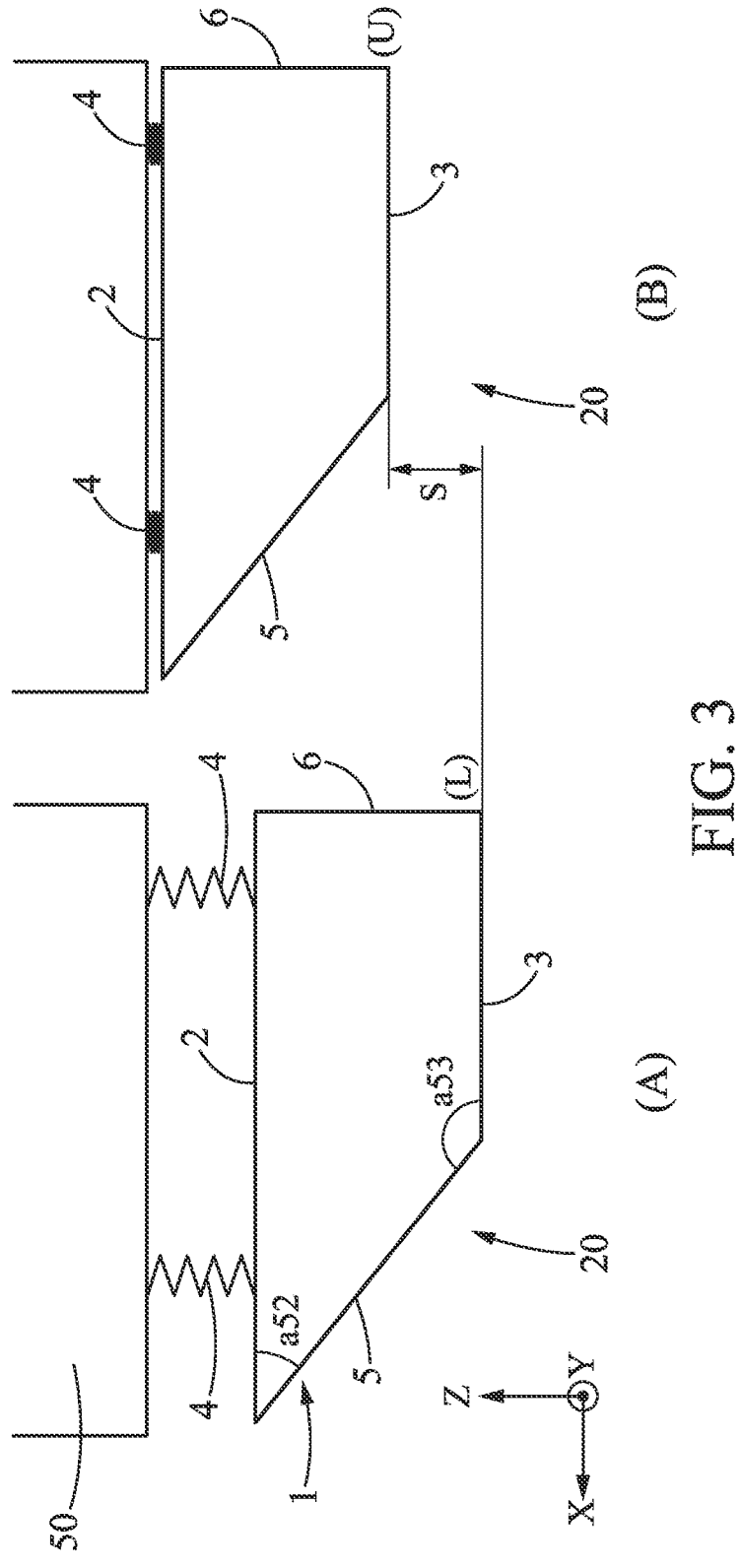
FIG. 3 is a schematic side of a first embodiment of a sidestep assembly.

FIG. 3 illustrates an embodiment of the sidestep assembly 20. The frame 1 comprises a first connection member 5 linking the upper member 2 and the lower member 3. The first connection member 5 makes an acute angle a52 with the upper member 2. The first connection member 5 makes an obtuse angle a53 with the lower member 3. The first connection member 5 makes an angle a53 comprised between 110° and 140° with the extension plane P of the lower member 3. The angulation of the first connection member 5 helps clearing the obstacles impacting the frame 1.

The first connection member 5 is oriented towards the front of the industrial vehicle 100 when the sidestep assembly 20 is in its nominal installation position on the industrial vehicle 100. The first connection member 5 comprises a first end 5-1 and a second end 5-2, the first end 5-1 of the first connection member 5 is closer to the front of the industrial vehicle 100 than the second end 5-2 of the first connection member 5.

The lower member 3 and the upper member 2 are here parallel. The lower member 3 and the upper member 2 extend in parallel planes. The frame 1 has a general shape of a parallelogram.

Figure 4:
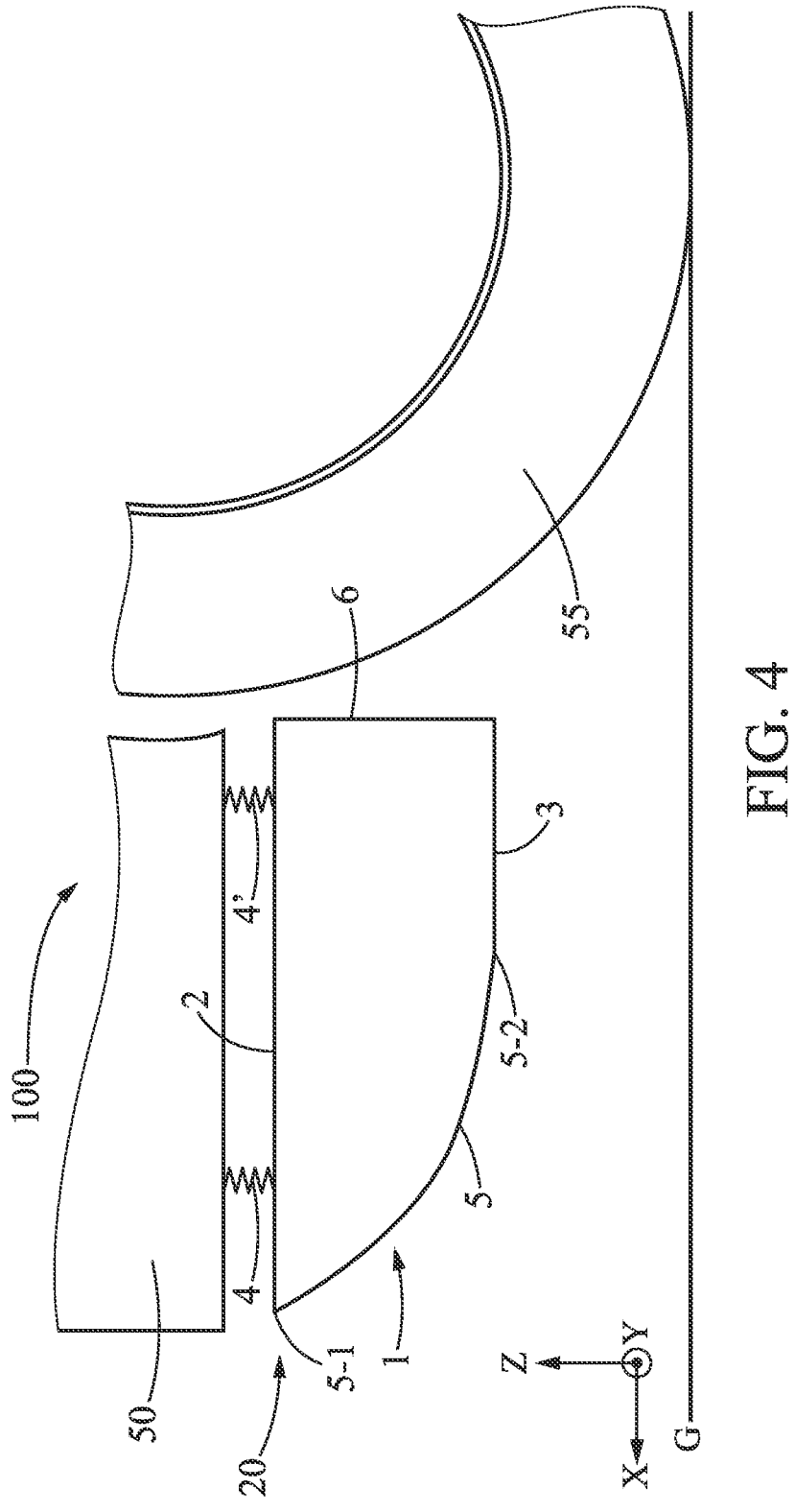
FIG. 4 is a schematic side view of an industrial vehicle partial equipped with a second embodiment of the sidestep assembly.

FIG. 4 illustrates another embodiment of the sidestep assembly 20. In this embodiment, the first connection member 5 is curved. A cross section of the first connection member 5, in a vertical plan parallel to the longitudinal axis X, is curved. In a cross section, the surface located between the first connection member 5 and the upper member 2 is convex. The curvature of the first connection member 5 is oriented towards the upper step member 2.

As the first connection member 5 is the part that's most likely to impact an obstacle when the industrial vehicle 100 is driven in the forward direction, the curved shaped of the first connection member 5 makes the obstacles easier to clear.

The frame 1 comprises a second connection member 6 linking the upper member 2 and the lower member 3. The second connection member 6 is oriented towards the back of the industrial vehicle 100 when the sidestep assembly 20 is in its nominal installation position on the industrial vehicle 100. The second connection member 6 may face the front wheel arch of the vehicle 100.

The second connection member 6 may be perpendicular to the lower member 3. The second connection member 6 may be perpendicular to the upper member 2.

In the embodiment of FIG. 4 in which the first connection member 5 is curved, the general shape of the frame 1 is a parallelogram with one curved side.

The frame 1 is preferably metallic. The frame 1 may comprise metallic sheets fixed to metallic posts.

In the illustrated embodiments of the sidestep assembly 20, the elastic member 4 comprises a helical spring.

The elastic member 4 may comprise two helical springs 4, 4' extending along parallel axis. The helical springs 4,4' extend along a vertical axis Z when the frame 1 is free of external constraints.

In a non-represented embodiment, the sidestep assembly 20 may comprise at least three helical springs, with the ends of the springs defining a regular triangle. This arrangement provides stability to the sidestep assembly.

The sidestep assembly 20 may be fixed to the industrial vehicle 100 only by the helical springs. In that case, the frame 1 can have a rotational motion combined with a translational motion relatively to the industrial vehicle 100. This situation is illustrated on FIGS. 6 and 7. On FIG. 6, the user is about to get into the cabin 40 of the truck 100. The sidestep assembly 20 is in the lower position L. On FIG. 7, an obstacle O is impacting the sidestep assembly 20 while the truck is driven, and the frame 1 has a combined vertical and transverse deflection, illustrated by the straight double arrow and curved arrow. The wheels of the vehicle 100 are not represented to simplify the representation.

In an embodiment of the sidestep assembly 20, each helical spring 4, 4' extends in a median longitudinal plan of the frame 1.

For example, the elastic member 4 comprises two helical springs 4, 4' each extending parallelly to the vertical direction Z, and the two helical springs 4, 4' are disposed in a plan parallel to a longitudinal axis X of the industrial vehicle.

In an embodiment illustrated on FIG. 5, the sidestep assembly 20 further comprises a guiding system 7 configured for guiding the frame 1 along a displacement axis.

The guiding system 7 comprises a plurality of guiding rods 8 fitted in reception holes 9 of the frame 1. The helical springs 4 may be coaxial with the guiding rods 8. On FIG. 5, the reception holes 9 define the corners of a rectangle, when seen in the direction of the vertical axis Z.

In an embodiment of the sidestep assembly 20, the frame 1 can be moved in a direction perpendicular to a surface of the lower member 3 between a lower position L and an upper position U,
and the sidestep assembly 20 comprises a first abutment member 11 configured for blocking a transverse motion of the frame 1 when the frame is in the lower position L. This configuration is represented on FIGS. 6 and 7.

The lower position L is the position taken by the sidestep assembly 20 when the frame 1 is free of external constraints. The upper position U is the position in which the deformation of the elastic member 4 is maximum. For example, the upper position U is obtained when the coils of the springs 4 are in contact with each other. This case is illustrated on part B of FIG. 3. The amplitude of the displacement between the lower position L and the upper position U is represented by the arrow S.

The first abutment member 11 is configured for allowing a transverse motion of the frame 1 when a distance between the frame 1 and the lower position L is higher than a first predetermined distance.

In other words, the frame 1 abuts against the first abutment member 11 when it is in the lower position L. Thus, the step assembly 20 remains steady when the user puts his weight on a step on his way to or from the cabin 50. When the frame 1 has been lifted upwards by an obstacle, the frame 1 is free from the abutment member 11, therefore a transverse motion of the frame is possible. Multiple directions of compliance are provided while ensuring a steady support for the user.

The first abutment member 11 comprises a first abutment surface 15 facing the frame 1 when the frame 1 is in the lower position L. For example, the first abutment member 11 faces the lower member 3 when the frame 1 is in the lower position L. More precisely, the first abutment member 11 faces the lower member 3 when the distance between the frame 1 and the lower position L is lower than the first predetermined distance.

Figure 7:
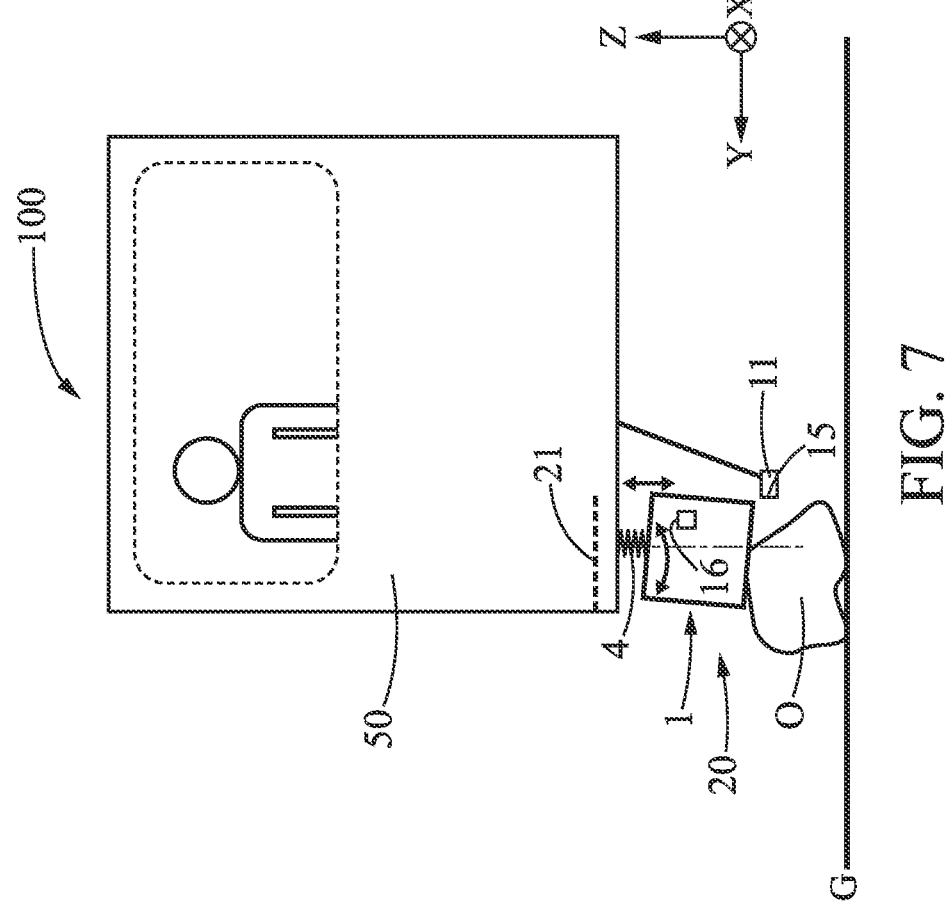
FIG. 7 is another partial rear view illustrating the operation of the sidestep assembly of FIG. 6.

As illustrated on FIG. 7, the first abutment surface 15 is offset from the frame 1 when a distance between the frame 1 and the lower position L is higher than the first predetermined distance.

Figure 6:
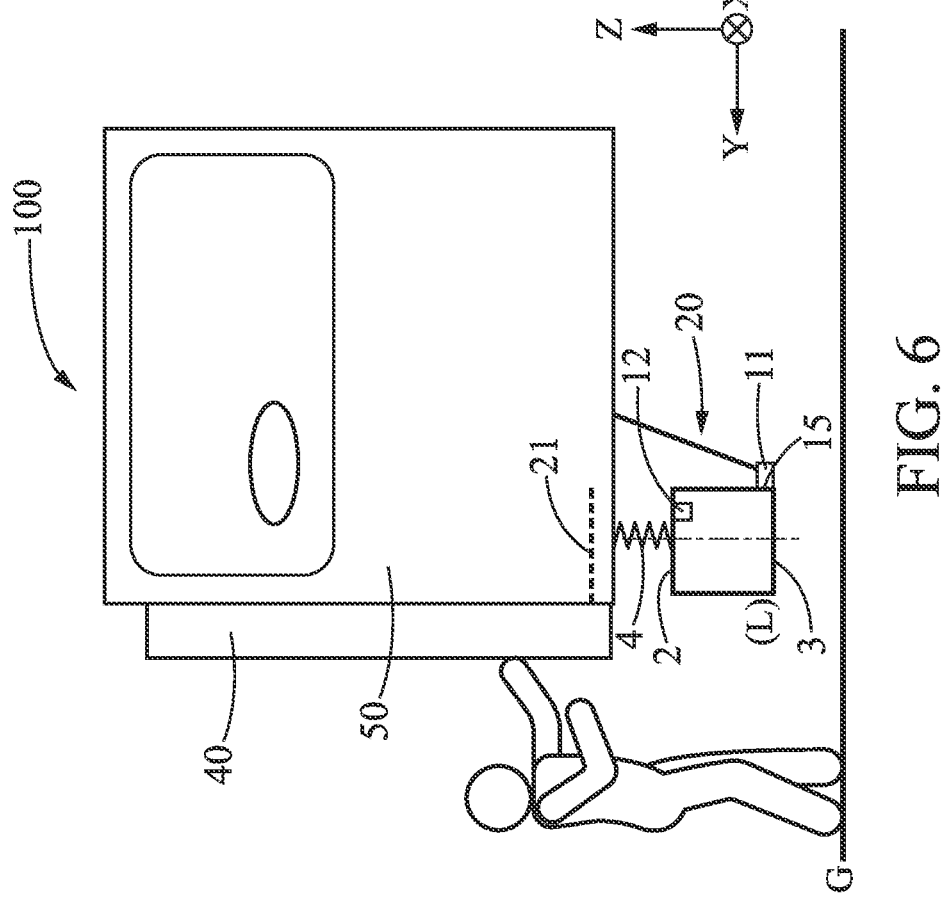
FIG. 6 is a partial rear view of an industrial vehicle equipped with an embodiment of a sidestep assembly.

In the embodiment illustrated on FIGS. 6 and 7, the sidestep assembly 20 also comprises a second abutment member 12 configured for blocking a vertical motion of the frame 1 when the frame 1 is in the lower position L.

The second abutment member 12 comprises a second abutment surface 16 on which the frame 1 abuts when the frame 1 is in the lower position L. The second abutment surface 16 may be disposed on a guiding rod 8, as it is the case on the embodiment of FIG. 5.

The sidestep assembly 20 may comprise a third abutment member configured for blocking a longitudinal motion of the frame 1 when the frame is in the lower position L. The third abutment member may comprise a third abutment surface facing the frame when the frame is in the lower position L.

The helical spring 4 may be preloaded. In other words, the helical spring 4 is already compressed when the frame is in the lower position L.

The effect of the preload is that the frame remains still as long as the external constraint applied to the frame 1 is inferior to a threshold. The preload ensures the frame 1 remains still under the effect of the small shocks caused by road irregularities, and prevents potential rattling noise issues.

In a non-represented embodiment, the industrial vehicle 100 comprises:
    a first step assembly 20 as described earlier, in which the upper member 2 is fixed to the industrial vehicle 100 on a first side of the vehicle corresponding to a driver entry door 40,
    a second step assembly 20 as described earlier, in which the upper member 2 is fixed to the industrial vehicle 100 on a second side of the vehicle corresponding to a passenger entry door.

Each side of the cabin is equipped its own step assembly. The two step assemblies may be identical. They can also be different in size and shape. Both driver and passengers can use the proposed step assembly.

The described sidestep assembly 20 can be integrated into an industrial vehicle as an original equipment, i.e., already fitted when the vehicle is rolling out the factory and ready to be delivered to the customer. The sidestep assembly 20 can be sold as an aftermarket kit. In that case, the sidestep assembly 20 is sold as a kit of parts and can be fitted on the vehicle at any moment of the vehicle use period. The kit of parts may be pre-assembled.

The invention claimed is:

1. A sidestep assembly for helping a user entering a cabin of an industrial vehicle, the sidestep assembly comprising:

a frame comprising:

an upper member;

a lower member on which the user can step for accessing and exiting the cabin; and an elastic member;

in which the upper member is configured to be fixed to the industrial vehicle by the elastic member so that the frame can be elastically displaced relative to the cabin when the frame is impacted by an obstacle;

wherein the sidestep assembly further comprises a guiding system configured for guiding the frame along a displacement axis.

2. The sidestep assembly of claim 1, wherein the frame is rigid.

3. The sidestep assembly of claim 1, wherein the frame comprises a first connection member linking the upper member and the lower member, and in which the first connection member makes an acute angle with the upper member and the first connection member makes an obtuse angle with the lower member.

4. The sidestep assembly of claim 1, wherein the first connection member is curved, the curvature of the first connection member being oriented towards the upper member.

5. The sidestep assembly of claim 3, wherein the frame comprises a second connection member linking the upper member and the lower member.

6. The sidestep assembly of claim 1, wherein the elastic member comprises a helical spring and wherein one end of the elastic member is fixed to the upper member.

7. The sidestep assembly of claim 1, wherein the elastic member comprises two helical springs extending along parallel axes and wherein one end of each elastic member is fixed to the upper member.

8. The sidestep assembly of claim 1, wherein the guiding system comprises a plurality of guiding rods fitted in reception holes of the frame.

9. The sidestep assembly of claim 1, wherein the frame can be moved in a direction perpendicular to a surface of the lower member between a lower position and an upper position; and wherein the sidestep assembly further comprises a first abutment member configured for blocking a transverse motion of the frame when the frame is in the lower position.

10. The sidestep assembly of claim 9, wherein the first abutment member is configured for allowing a transverse motion of the frame when a distance between the frame and the lower position is higher than a first predetermined distance.

11. The sidestep assembly of claim 9, further comprising a second abutment member configured for blocking a vertical motion of the frame when the frame is in the lower position.

12. An industrial vehicle comprising the sidestep assembly of claim 1, wherein the upper member is fixed to the industrial vehicle by the elastic member.

13. The industrial vehicle of claim 12, wherein the elastic member comprises two helical springs each extending parallel to the vertical direction, and wherein the two helical springs are disposed in a plan parallel to a longitudinal axis of the industrial vehicle.

14. An industrial vehicle comprising:

the sidestep assembly of claim 1, wherein the upper member is fixed to the industrial vehicle on a first side of the vehicle corresponding to a driver entry door; and wherein the upper member is fixed to the industrial vehicle on a second side of the vehicle corresponding to a passenger entry door.

\* \* \* \* \*